United States Patent
Hornung et al.

(10) Patent No.: US 9,191,382 B1
(45) Date of Patent: Nov. 17, 2015

(54) USER AUTHENTICATION USING SWAPPABLE USER AUTHENTICATION SERVICES

(71) Applicant: Google Inc., Mountain View, CA (US)

(72) Inventors: Zelidrag Hornung, Los Gatos, CA (US); William A. Drewry, Nashville, TN (US); Sumit Gwalani, Sunnyvale, CA (US); Christopher Masone, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/735,556

(22) Filed: Jan. 7, 2013

Related U.S. Application Data

(60) Provisional application No. 61/659,601, filed on Jun. 14, 2012.

(51) Int. Cl.
*H04L 9/00* (2006.01)
*H04L 29/06* (2006.01)

(52) U.S. Cl.
CPC ...................................... *H04L 63/08* (2013.01)

(58) Field of Classification Search
CPC ... H04L 9/32; H04L 9/3226; H04L 29/06755; H04L 2463/082; H04N 21/25816; G06F 21/30; G06F 2211/003
USPC .......................................................... 726/7, 5
See application file for complete search history.

(56) References Cited

U.S. PATENT DOCUMENTS

| | | | |
|---|---|---|---|
| 5,774,551 A | 6/1998 | Wu et al. | |
| 6,898,711 B1 * | 5/2005 | Bauman et al. | 713/185 |
| 6,928,547 B2 | 8/2005 | Brown et al. | |
| 2009/0328134 A1 * | 12/2009 | Ray et al. | 726/1 |
| 2010/0082960 A1 * | 4/2010 | Grobman et al. | 713/2 |
| 2010/0153697 A1 * | 6/2010 | Ford et al. | 713/2 |
| 2010/0203955 A1 * | 8/2010 | Sylla | 463/25 |
| 2010/0274859 A1 * | 10/2010 | Bucuk | 709/206 |
| 2012/0266209 A1 * | 10/2012 | Gooding et al. | 726/1 |

(Continued)

OTHER PUBLICATIONS

Coppola, et al, "Virtual Organization Support within a Grid-Wide Operating System", IEEE Internet Computing, Mar./Apr. 2008, 9 pages.

(Continued)

*Primary Examiner* — Hadi Armouche
*Assistant Examiner* — Ali Shayanfar
(74) *Attorney, Agent, or Firm* — Brake Hughes Bellermann LLP

(57) ABSTRACT

Methods and apparatus for authenticating computing device users are disclosed. An example method includes, providing, on a display device of a computing device, a graphical user interface (GUI) including a user authentication display portion and receiving, from a remote authentication server, visual content and functional content corresponding with the user authentication display portion. The method further includes receiving, via the user authentication display portion, a set of user credentials and communicating the received user credentials to the remote user authentication server. The method still further includes receiving, from the remote user authentication server, an authorization message indicating whether or not authentication of the user credentials was successful. In the event authentication of the set of user credentials was successful, the user is granted access to the computing device. In the event authentication of the set of user credentials was not successful, the user is denied access to the computing device.

21 Claims, 5 Drawing Sheets

(56) References Cited

U.S. PATENT DOCUMENTS

2013/0097682 A1* 4/2013 Zeljkovic et al. .................. 726/7
2013/0104202 A1* 4/2013 Yin et al. .......................... 726/5
2013/0311582 A1* 11/2013 Thai .............................. 709/206

OTHER PUBLICATIONS

Samar, et al, "Making Login Services Independent of Authentication Technologies", In Proceedings of the SunSoft Developer's Conference, Mar. 1996, 10 pages.

* cited by examiner

USER AUTHENTICATION USING SWAPPABLE USER AUTHENTICATION SERVICES

CROSS REFERENCE TO RELATED APPLICATION

This application claims priority to, and the benefit of, U.S. Provisional Patent Application No. 61/659,601, filed on Jun. 14, 2012, and entitled "USER AUTHENTICATION USING SWAPPABLE USER AUTHENTICATION SERVICES", which is hereby incorporated by reference in its entirety.

TECHNICAL FIELD

This document relates, generally, to authentication of users on a computing system.

BACKGROUND

Computing devices, such as personal computers, laptop computers, netbook computers, and other such devices often use respective authentication mechanisms to restrict the use of such computing devices to authorized users, where those respective authentication mechanisms operate as an integrated part of an operating system (OS) of a given computing device. In certain situations, however, it may be desirable to implement alternative authentication mechanisms for authorizing computing device users to gain access to an operating system of a computing device. In such situations, OS integrated authentication mechanisms can reduce or prevent such flexibility to implement alternative authentication approaches.

For instance, as one possible example, an enterprise with a large number of computer users may wish to implement a much more secure authentication process than is provide by a given OS integrated authentication mechanism for computing devices that are used in connection with a computing network of the enterprise. In such a situation, the enterprise would need to modify the OS for each computer that is used in connection with its network in order to implement the desired authentication process. Further, if changes are made to that authentication process, each computing device of the enterprise would need to be modified in order to implement those changes. Having to make such modifications may be time consuming, complicated and expensive.

SUMMARY

In a general aspect, a method for authenticating a user on a computing device includes providing, on a display device of the computing device, a graphical user interface (GUI). The GUI includes a user authentication display portion, where visual content displayed in the user authentication display portion and functional operation of the user authentication display portion are independent of an operating system of the computing device. The method further includes, receiving, from a user via the user authentication display portion, a set of user credentials and communicating, by the computing device, the received set of user credentials to a remote user authentication server. The method also includes receiving, from the remote user authentication server; an authorization message indicating whether or not authentication of the set of user credentials was successful. In the event authentication of the set of user credentials was successful, the method includes granting the user access to the computing device. In the event authentication of the set of user credentials was not successful, the method includes denying the user access to the computing device.

Implementations may include one or more of the following features. For instance, the user credentials may include at least one of a username, a password, a personal identification number, a voice authentication sample, a photograph and a fingerprint scan.

In the event the set of user credentials was previously authenticated using the computing device, granting the user access to the computing device may include synchronizing one or more authorization tokens associated with the set of user credentials between the computing device and the remote authentication server and storing, on the computing device, the synchronized authentication tokens in a user account profile that is associated with the set of user credentials. The operating system of the computing device may be a browser based operating system and synchronizing the one or more authorization tokens may include synchronizing one or more browser cookies in the user account profile.

In the event the set of user credentials was not previously authenticated using the computing device, granting the user access to the system may include creating, on the computing device, a user account profile that is associated with the set of user credentials. The method may include receiving, from the remote authentication server a cryptographically generated value that is based on the set of user credentials and executable code. The executable code may be configured, when executed by the computing device, to produce the cryptographically generated value from the set of user credentials. The method may also include storing the received cryptographically generated value and the received executable code in the created user account profile.

In the event the set of user credentials was not previously authenticated using the computing device, granting the user access to the system may include, creating, on the computing device, a user account profile that is associated with the set of user credentials. The method may include receiving, from the remote authentication server, one or more authorization tokens associated with the set of user credentials and storing, by the computing device, the received one or more authorization tokens in the created user account profile. The operating system of the computing device may be a browser based operating system and receiving the one or more authorization tokens may include receiving one or more browser cookies. Storing the received one or more authorization tokens may include populating a browser cookie jar of the created user account profile.

Receiving the one or more authorization tokens may include receiving an account secret associated with the set of user credentials. The method may include receiving, by the computing device, an indication from the user to log out of the user account. In response to the indication, the method may include discontinuing the user's access to the computing device. The method may include again receiving, from the user by the computing device, the set of user credentials and granting the user access to the computing device using the received account secret to authenticate the again received set of user credentials. The account secret may include a cryptographically generated value that is based on the set of user credentials and executable code configured, when executed by the computing device, to produce the cryptographically generated value from the set of user credentials.

Providing the GUI may include providing an operating system display portion, where content of the operating system display portion is determined by the operating system of the computing device. The user authentication display portion may include one of an inline frame and a mini-web-browser.

The operating system of the computing device may be a browser-based operating system. The visual content displayed in the user authentication display portion and the functional operation of the user authentication display portion may be provided in accordance with a browser extension. An identity of the remote user authentication server may be determined by the browser extension.

The visual content displayed in the user authentication display portion and the functional operation of the user authentication display portion may be determined by the remote user authentication server.

In another general aspect, a computing device includes a processor, a display device and a non-transitory machine readable medium having instructions stored thereon. The instructions, when executed by the processor, cause the computing device to provide, on the display device, a graphical user interface (GUI). The GUI includes a user authentication display portion. The instructions, when executed by the processor, further cause the computing device to receive, from a remote user authentication server, visual content and functional content corresponding with the user authentication display portion. The instructions, when executed by the processor, still further cause the computing device to receive, from a user via the user authentication display portion, a set of user credential; communicate the received user credentials to the remote user authentication server; and receive, from the remote user authentication server, an authorization message indicating whether or not authentication of the set of user credentials was successful. In the event authentication of the set of user credentials was successful, the instructions, when executed by the processor, cause the computing device to grant the user access to the computing device. In the event authentication of the set of user credentials was not successful, the instructions, when executed by the processor, cause the computing device to deny the user access to the computing device.

Implementations may include one or more of the following features. For instance, in the event the set of user credentials was previously authenticated using the computing device, the instructions for granting the user access to the computing device may include instructions that, when executed by the processor, cause the computing device to synchronize one or more authorization tokens associated with the set of user credentials between the computing device and the remote authentication server and store, on the computing device, the synchronized authentication tokens in a user account profile that is associated with the set of user credentials. An operating system of the computing device may be a browser based operating system and synchronizing the one or more authorization tokens may include synchronizing one or more browser cookies in the user account profile.

In the event the set of user credentials was not previously authenticated using the computing device, the instructions for granting the user access to the computing device may include instructions that, when executed by the processor, cause the computing device to create, on the computing device, a user account profile that is associated with the set of user credentials. The instructions for granting the user access to the computing device may include instructions that, when executed by the processor, cause the computing device to receive, from the remote authentication server, a cryptographically generated value that is based on the set of user credentials and executable code configured, when executed by the computing device, to produce the cryptographically generated value from the set of user credentials. The instructions for granting the user access to the computing device may include instructions that, when executed by the processor, cause the computing device to store the received cryptographically generated value and the received executable code in the created user account profile.

The instructions may include instructions that, when executed by the processor, cause the computing device to receive an indication from the user to log out of a user account associated with the user account profile; in response to the indication, discontinue the user's access to the computing device; again receive, from the user, the set of user credentials; and grant the user access to the computing device using the received account secret to authenticate the set of user credentials.

In another general aspect, a non-transitory machine readable medium has instructions stored thereon, wherein the instructions, when executed by a processor, cause a computing device to provide, on a display device of the computing device, a graphical user interface (GUI). The GUI includes a user authentication display portion, where visual content displayed in the user authentication display portion and functional operation of the user authentication display portion are independent of an operating system of the computing device. The instructions, when executed by a processor further cause the computing device to receive, from a user via the user authentication display portion, a set of user credentials and communicate the received set of user credentials to a remote user authentication server. The instructions, when executed by a processor still further cause the computing device to receive, from the remote user authentication server; an authorization message indicating whether or not authentication of the set of user credentials was successful. In the event authentication of the set of user credentials was successful, the instructions, when executed by the processor, cause the computing device to grant the user access to the computing device. In the event authentication of the set of user credentials was not successful, the instructions, when executed by the processor, cause the computing device to deny the user access to the computing device.

In another general aspect, a method for authenticating a user on a computing device includes providing, on a display device of the computing device, a graphical user interface (GUI), the GUI comprising a user authentication display portion, and receiving, from a remote authentication server, visual content and functional content corresponding with the user authentication display portion. The method further includes receiving, from a user via the user authentication display portion, a set of user credentials and communicating, by the computing device, the received set of user credentials to the remote user authentication server. The method still further includes receiving, from the remote user authentication server; an authorization message indicating whether or not authentication of the set of user credentials was successful. In the event authentication of the set of user credentials was successful, the method includes granting the user access to the computing device. In the event authentication of the set of user credentials was not successful, the method includes denying the user access to the computing device.

BRIEF DESCRIPTION OF THE DRAWINGS

Like reference symbols in the various drawings indicate like elements.

DETAILED DESCRIPTION

Figure 1:
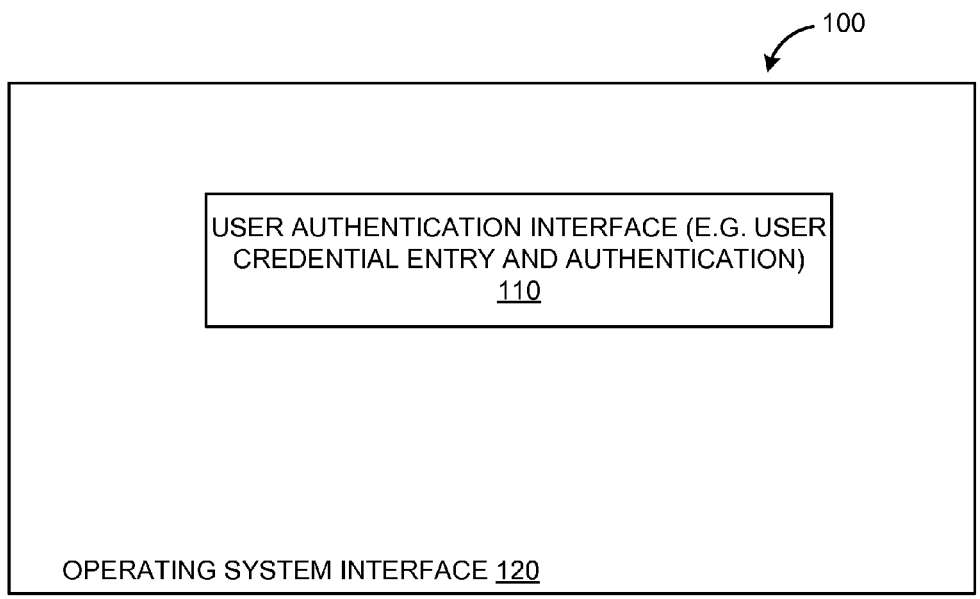
FIG. 1 is a diagram illustrating a computing device login interface including a user authentication interface display portion in accordance with an example implementation.

FIG. 1 is a diagram illustrating a computing device login interface 100 (e.g., a graphical user interface (GUI)) in accordance with an example implementation. The interface 100 may be used to implement the approaches described herein in order to allow for an associated computing device to implement swappable user authentication services on a given computing device. In such approaches, user authentication services (e.g., user authentication service logic) for a given computing device can be changed (e.g., swapped, plugged in out) without having to modify an operating system (OS) of the given computing device, thus overcoming at least some of the shortcomings of OS integrated authentication mechanisms, such as those discussed above.

In an example implementation, the interface 100 may be used to authenticate users, using swappable or pluggable user authentication service logic, in order to determine whether or not to grant a given user access to a given computing device (e.g., to start an OS session and/or create an associated user account profile on the computing device). For purposes of this disclosure, such swappable or pluggable user authentication service logic is referred to as being independent of the OS of a corresponding computing device, so as to indicate that the authentication service logic is not integrated into the OS and that different sets of authentication service logic may be used (e.g., swapped or plugged in) with a given computing system, where the specific authentication service logic that is used would depend on the particular implementation. In such approaches, the display content and functional operation of a given set of authentication logic may be "opaque" to the OS of a corresponding computing device (e.g., not determined by and not controlled by the OS). For instance, the display content and functional operation of a given set of authentication logic may be determined by a web-based (cloud-based), "remote" authentication server, such as described herein.

In such implementations, granting a user access to a given computing device may include, after successfully authenticating the user (e.g., using the techniques described herein), starting an OS session on the computing device, thus allowing the user to access computing resources (e.g., applications, hardware, etc.) that are available on, or accessible through the computing device. Conversely, in such implementations, if authentication of the user is not successful, the user may be denied access to the computing device. For instance, in this situation, an OS session may not be started and the user may be provided with a notification (not shown), e.g., via the interface 100, that authentication has failed. Such notifications may be provided by the authentication service logic or, alternatively, could be provided by the computing device in other fashions, such as in response to an authorization message (e.g., a message indicating that authentication has failed) that is generated by the authentication service logic and communicated to the OS or to another component of the computing device.

As shown in FIG. 1, the computing device login interface 100 includes a user authentication interface display portion 110 and an OS interface display portion 120. As was briefly discussed above, visual content that is displayed in the user authentication display portion 110 and functional operation of the user authentication interface portion 110 may be independent of an OS of an associated computing device. For instance, the user authentication interface 110 may operate in accordance with a set of swappable authentication service logic that is not integrated in (and not dependent on) the OS of the computing device. In an example implementation, such swappable authentication service logic may be located on a remote user authentication server that is in communication with a given computing device over a network, such as in an arrangement similar to that shown in FIG. 2. Such an authentication server may be a web-based (cloud-based) server. In other implementations, such swappable authentication service logic may be located, in part, on a remote authentication server and, in part, on an associated computing device, where each part of the swappable authentication service logic is implemented using code that is operationally independent of (operationally "opaque" to) an OS of the computing device, such as in the fashions described herein (e.g., using an arrangement such as that shown in FIG. 2).

In the computing device login interface 100 shown in FIG. 1, the OS interface portion 120 may include display content that is determined by an OS of an associated computing device and also may operate in accordance with the OS. For instance, the OS interface portion 120 may include an OS background display and/or a date and time display, as well as including other features and aspects (e.g., both visual and functional) of the OS of the computing device. For instance, the OS interface portion 120 may include icons and/or buttons to shut the computing system down or to cancel a user login attempt. The particular content displayed in the OS interface portion 120, as well as the functional operation of the OS interface portion 120 would depend on the particular implementation (e.g., the specific OS that is implemented by a corresponding computing device).

In an example implementation, the OS implemented by a given computing device may be a browser-based OS (e.g., an OS that operates based on Web enabled code, such as HTML JavaScript, etc.). In such approaches, the user authentication interface portion 110 of the login interface 100 may be implemented as an inline frame (iframe) or as a mini-web-browser session, depending on the particular implementation. In such approaches, an authentication interface 110 iframe or mini-web-browser session (e.g., a single site web-browser) may operate in accordance with swappable or pluggable user authentication service logic, such as described herein. Of course, such approaches may also be used in computing devices that implement a non-browser based OS.

Figure 2:
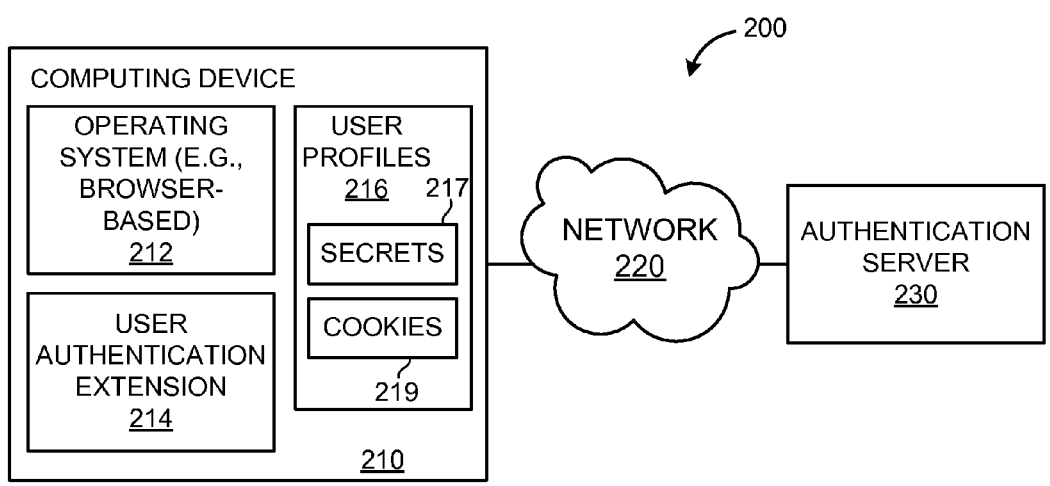
FIG. 2 is a block diagram illustrating a network that may be used to authenticate computing device users in accordance with an example implementation.

FIG. 2 is a block diagram illustrating a network 200 that may be used to implement techniques for authenticating computing device users using swappable (pluggable) user authentication service logic in accordance with an example embodiment. The particular arrangement of the network 200 shown in FIG. 2 is given by way of example and for purposes of illustration. It will be appreciated that other arrangements are possible and that the network 200 may include additional elements, alternative elements and/or fewer elements than shown in FIG. 2.

As illustrated in FIG. 2, the network 200 includes a computing device 210, a network 220 (e.g., the Internet) and a remote (e.g., web-based) authentication server 230. The computing device 210 of the network 200 includes an OS 212 (e.g., a browser-based OS), a user authentication extension 214 and user profiles 216. Depending on the particular implementation, the elements of the computing system 210 may be arranged in other fashions, certain elements may be replaced with other, alternative, elements, elements may be added and/or elements may be eliminated. In such an approach, the user authentication extension 214 may be a web-browser extension (e.g., that adds additional functionality to the computing system 210 that is not included in the OS 212) that is used to implement, at least in part, a set of swappable user authentication logic. For instance, the extension 214 may operate in conjunction with the remote authentication server 230 to perform user authentication for the computing device 210, such as using the techniques described herein. Further, the computing device 210 may be implemented using approaches illustrated in FIG. 5 and discussed below.

In one example, the computing device 210 may implement the computing device login interface 100 shown in FIG. 1. In such an approach, the user authentication extension 214 may include machine-readable instructions that, when executed by a processor (not shown) of the computing device 210, result in the processor defining the boundaries of the user authentication interface 110, such as by defining an iframe or a mini-web-browser. The extension 214 may also include an address (e.g., a Web address) of the authentication server 230. In this example, after setting up the iframe or mini-web-browser for the user authentication interface portion 110 of the login interface 100, the extension 214 may transfer control of the user authentication interface 110 to the authentication server 230.

The authentication server 230 may then communicate with the computing device 210 over the network 220 to perform user authentication in accordance with a set of user authentication service logic that is stored on the authentication server 230. This process may include the authentication server 230 providing display content for the user authentication interface 110 and executing one or more user authentication operations. In certain implementations, the display content from the authentication server 230 may be cached by the extension 214. Such cached content may then be subsequently used to authenticate previously authenticated users when the computing device 210 is unable to access the authentication server 230 (e.g., when the network 220 is not available).

The particular user authentication operations that are performed in such an approach will depend on the particular implementation, such as based on respective security requirements of a given web-based and/or enterprise authentication service. For instance, the user authentication operations may include verifying a provided username and password; performing facial recognition using an integrated camera of the computing device 210 or a camera that is operably coupled with the computing device 210; performing voice recognition using an integrated microphone of the computing device 210 or a microphone that is operably coupled with the computing device 210; performing fingerprint scanning using an integrated fingerprint reader of the computing device 210 or a fingerprint reader that is operably coupled with the computing device 210; and/or performing a number of other possible user authentication operations, such as using an out-of-band communication channel (e.g., an SMS message) to send an authorization token or personal identification number (PIN) that the given user must enter via the user authentication interface 110 (e.g., under control of the extension 214 and/or the authentication server 230).

Using such approaches for user authentication allows for flexibility to swap or plug in/out different or additional user authentication logic. For instance, changing the user authentication operations that are implemented by the authentication server 230 would be effective for any computer that accesses the server 230 to perform user authentication. Also, the authentication service logic that is implemented by the computing device 210 may be swapped by the extension 214 referencing a different authentication server than the server 230. In other approaches, the computing device 210 may be configured to communicate with multiple remote user authentication servers to implement a user authentication process. Using such approaches, user authentication service logic for the computing device 210 may be swapped (plugged in and out) without having to modify the OS of the device.

In the computing device 210, the user profiles 212 may include one or more user account profiles for users that have previously been authenticated as having authorized access to the computing device 210. For example, a user account profile of the user profiles 216 for a given user may include a user (ID) identifier (e.g., an email address) and one or more authorization tokens corresponding with the user ID. In an example implementation, the one or more authorization tokens may include, for example, an account secret 217 and/or one or more browser cookies 219, as some examples.

The account secret 217 may be a cryptographically generated value that is based on the user credentials, such as a secure hash value (e.g., generated using a secure hash algorithm) that is based on an account password (and/or other user credential items) for the given user. In one approach, the authentication server 230 may provide the account secret 217 for a given user to the computing device 210 by providing such a cryptographically generated value that is based on a user's credentials (e.g., that are provided during authentication) and also providing executable code that is configured, when executed by the computing device 210, to generate the same cryptographic value from the user's credentials. In such an approach, once the user has been authenticated on the computing device 210, the executable code and the cryptographically generated value provided to the computing device 210 by the authentication server 230 may be used to authenticate the user when the computing device 210 is offline (e.g., does not have access to the network 220 and/or the authentication server 230). For instance, the user may enter his or her user credentials (e.g., when the computing device 210 is offline) and the executable code may then be used, by the computing device 210, to generate a cryptographic value based on the entered credentials. The cryptographic value generated by the computing device 210 may then be compared to the cryptographic value provided by the authentication server 230 (e.g., which may be stored in the user account profile). If the values match, the user may be authenticated (given access to use the computing device 210). If the values do not match, the user may be denied access to the computing device.

Depending on the particular implementation, other types of authorization tokens may be included in a given user account profile, such as, for example, Open Authorization (OAuth) tokens. In an example approach, the authentication server 230 may provide the one or more authorization tokens (including the account secret 217) to the computing device 210 as part of an authorization message indicating that a given user has been successfully authenticated for access to the computing device 210. Using such techniques, once a user is successfully authenticated, each of the authorization tokens received from the remote authentication server 230 (and included in the user account profile) may be active, allowing the user to access corresponding services (e.g., Web services, such as email) without having to go through a separate user verification process for those services.

Figure 3:
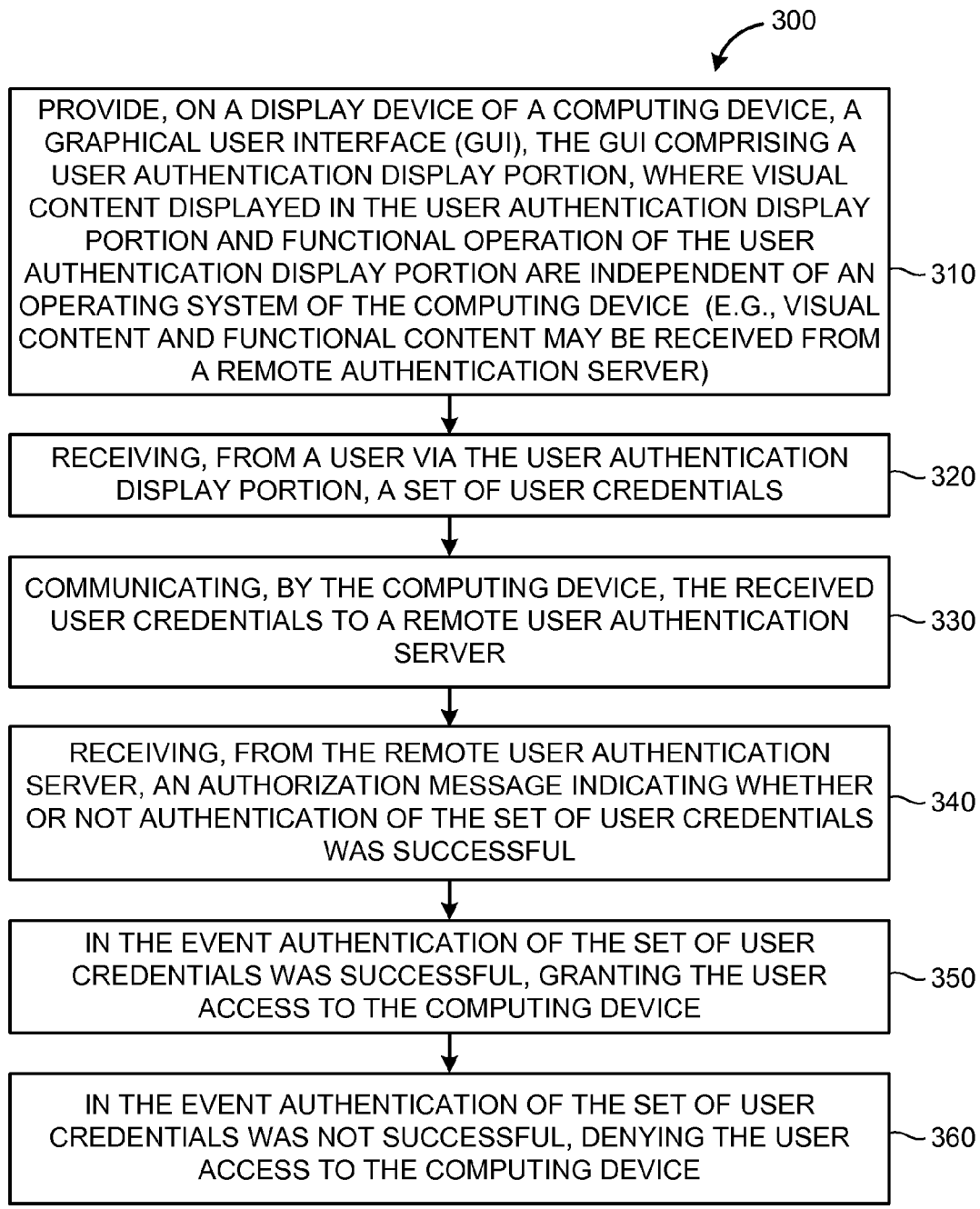
FIG. 3 is a flowchart illustrating a method for authenticating a user on a computing device in accordance with an example implementation.

FIG. 3 is a flowchart illustrating a method 300 for authenticating a user on a computing device in accordance with an example implementation. The method 300 may be implemented in the network 200 of FIG. 2, using the user login interface 100 of FIG. 1. Accordingly, for purposes of illustration, the method 300 will be described with further reference to FIGS. 1 and 2, as appropriate. It will be appreciated, however, that the method 300 may be implemented in networks and/or computing devices having other arrangements, and by using user login interfaces other than the user login interface 100.

As shown in FIG. 3, the method 300, when implemented using the approaches illustrated in FIGS. 1 and 2, includes, at block 310, providing, on a display device (not shown in FIG. 2) of the computing device 210, a graphical user interface (GUI) (the user login interface 100), the GUI comprising a user authentication display portion 110. In the method 300, at block 310, in like fashion as previously described, visual content that is displayed in the user authentication display portion 110 and functional operation of the user authentication display portion 110 may be independent of the OS 212 of the computing device 210. For instance, the visual content and functional content associated with the user authentication display portion 110 may be received from the authentication server 230.

The method 300 further includes, at block 320, receiving, from a user via the user authentication display portion 110, a set of user credentials. The user credentials received at block 320 may include a user ID, a password, a fingerprint scan, a picture taken with an integrated camera or other camera that is coupled with the computing device 210, an authorization token and/or a number of other possible user credentials that may be requested, for example, by user authentication service logic implemented by the extension 214 and/or the authentication server 230. At block 330, the method 300 includes the computing device 210 communicating the received user credentials to the remote user authentication server 230.

Depending on the particular embodiment, at block 330 of the method 300, multiple received user credentials may be communicated together in a single transmission, and/or received user credentials may be communicated in multiple transmissions. Likewise, at block 320, the user credentials may be received together, and/or may be received at separate times. For instance, in an example implementation, at block 320, a user ID and password may be received together (e.g., in response to a first request presented in the user authentication interface 110) and a fingerprint scan may be received separately from the user ID and password (e.g., in response to a second request). In this example, the user ID and password, at block 330, may be communicated to the authentication server 230 together (e.g., in a single transmission), while the fingerprint scan may be communicated to the authentication server 230 separately from the user ID and password.

The method 300 additionally includes, at block 340 (e.g., after execution of user authentication service logic is completed, such as in connection with blocks 310-330), receiving, at the computing device 210 from the remote user authentication server 230; an authorization message indicating whether or not authentication of the set of user credentials was successful. For instance, if the provided user credentials were not properly authenticated, the authorization message would indicate that the user authentication was unsuccessful. However, if the provided user credentials were properly authenticated, the authorization message would indicate that the user authentication was successful. In an example implementation, if user authentication was successful, the authorization message at block 340 may include a redirection message to redirect the browser-based OS 212 to a login success web page, where the login success web page may be included in the extension 214.

In the event authentication of the set of user credentials was successful, the method 300 includes, at block 350, granting the user access to the computing device 210, such as by closing the user authentication interface 110 and starting an OS session on the computing device 210. Depending on the particular implementation, other operations may be performed in conjunction with granting an authenticated user access to the computing device 210. For instance, in situations where the authenticated user has been previously authenticated on a given computing device, the operations of the method 400 illustrated in FIG. 4A may be performed in conjunction with granting access at block 350. In situations where the authenticated user has not been previously authenticated on a given computing device, the operations of the method 420 illustrated in FIG. 4B may be performed in conjunction with granting access at block 350.

In the event authentication of the set of user credentials was not successful, the method 300 includes, at block 360, denying the user access to the computing device. Denying the user access at block 360 may include providing a notification message to the user indicating that the user authentication attempt was unsuccessful. Additional information may also be provided to the user at block 360, e.g., via the user authentication interface 110, such as instructions for obtaining assistance or other relevant information, depending on the particular situation.

Figure 4A:
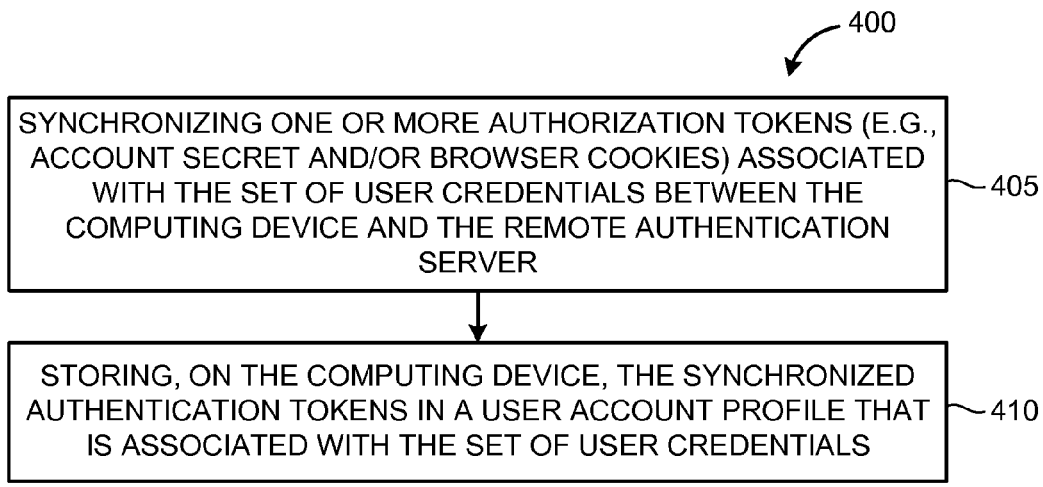
FIGS. 4A-4C are flowcharts illustrating methods that may be implemented in conjunction with the method of FIG. 3 in accordance with example implementations.
Figure 4B:
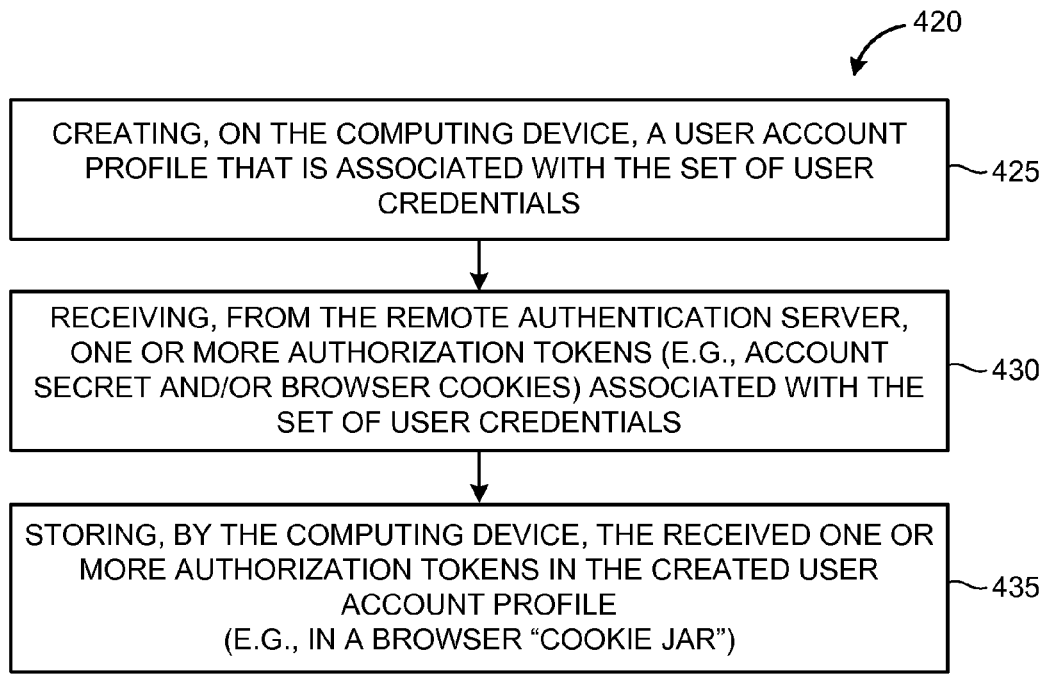
Figure 4C:
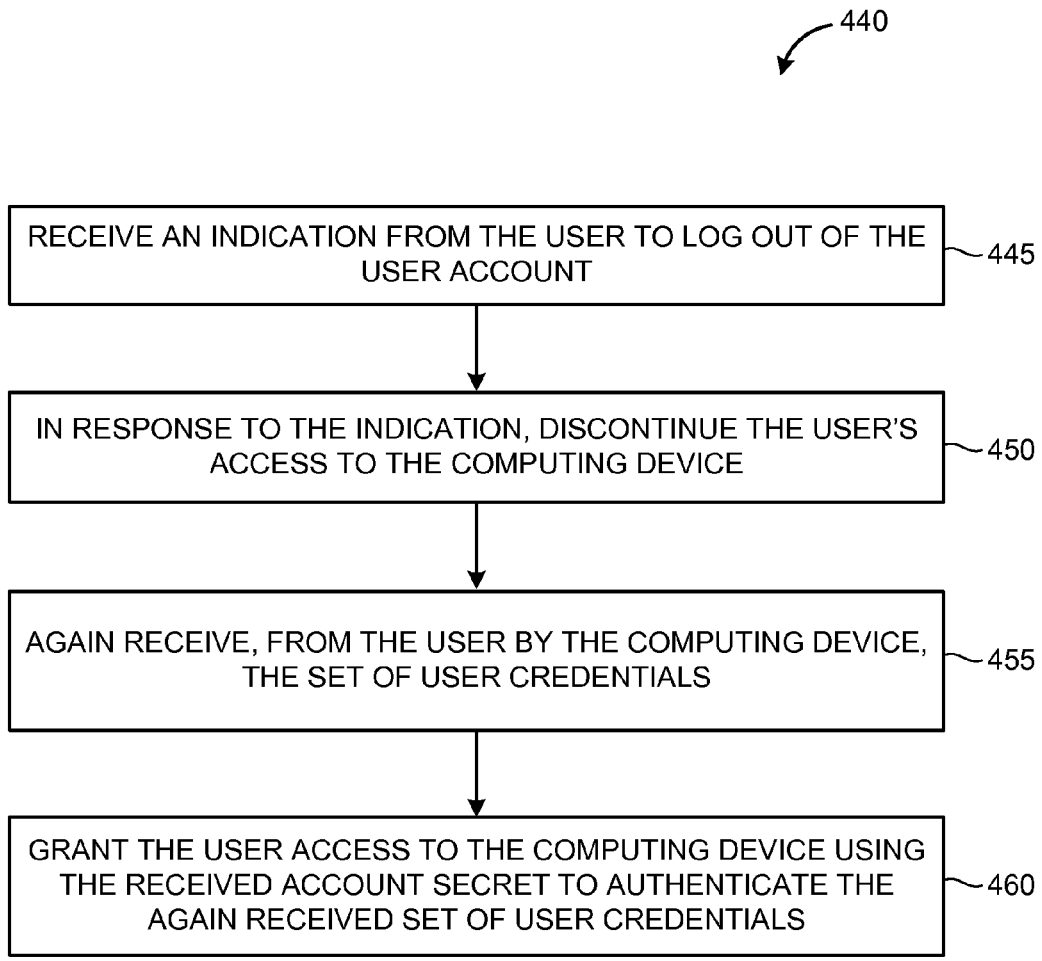

FIGS. 4A-4C are flowcharts illustrating, respectively, methods 400, 420 and 440 that may be implemented in conjunction with the method 300 of FIG. 3 in accordance with example implementations. In like fashion as the method 300, the methods 400, 420 and 440 may be implemented in the network 200 of FIG. 2, using the user login interface 100 of FIG. 1. Accordingly, for purposes of illustration, the methods 400, 420 and 440 will be described with further reference to FIGS. 1-3, as appropriate. It will be appreciated, however, that the methods 400, 420 and 440 may be implemented in networks and/or computing devices having other arrangements, and by using user login interfaces other than the user login interface 100.

FIG. 4A is a flowchart illustrating a method 400 that, as was indicated above, may be performed in conjunction with granting an authenticated user access to the computing device 210 at block 350 of the method 300. As was also noted above, the method 400 may be implemented (in conjunction with block 350 of the method 300) in situations where an authenticated user has been previously authenticated on a given computing device (e.g., the user already has a user account profile 216 on the computing device 210). As shown in FIG. 4A, the method 400 includes, at block 405, synchronizing one or more authorization tokens associated with the set of user credentials between the computing device 210 and the remote authentication server 230. Depending on the particular implementation, synchronizing the authorization tokens at block 405 may include synchronizing an account secret (e.g., using the techniques described herein), one or more browser cookies and/or one or more other types of authorization tokens, such as one or more OAuth tokens. At block 410, the method 400 includes storing, on the computing device 210, the synchronized authentication tokens (e.g., account secret 217, browser cookies 219 and/or other authorization tokens) in a user account profile 216 that is associated with the provided set of user credentials (e.g., from block 320). For instance, the browser cookies 219 may be stored in a "cookie jar" that is associated with the authenticated user, where the cookie jar may be implemented as using directory (that includes respective files for each of the one or more browser cookies and/or authorization tokens) or a file (that includes the one or more browser cookies and/or authorization tokens combined in a single file) on the computing device 210 that is associated with the user account profile 216 of the authenticated user.

FIG. 4B is a flowchart illustrating a method 420 that, as was indicated above, may be performed in conjunction with granting an authenticated user access to the computing device 210 at block 350 of the method 300. As was also noted above, the method 420 may be implemented (in conjunction with block 350 of the method 300) in situations where an authenticated user has not been previously authenticated on a given computing device (e.g., the user does not have a user account profile 216 on the computing device 210). As shown in FIG. 4B, the method 420 includes, at block 425, creating, on the computing device, a user account profile 216 that is associated with the set of user credentials. At block 430, the method 420 includes receiving one or more authorization tokens associated with the set of user credentials at the computing device 210 from the remote authentication server 230. Depending on the particular implementation, the received authorization tokens at block 430 may include an account secret 217, one or more browser cookies 219 and/or one or more other types of authorization tokens, such as one or more OAuth tokens. At block 435, the method 420 includes storing, on the computing device 210, the received authentication tokens (e.g., account secret 217, browser cookies 219 and/or other authorization tokens) in the user account profile 216 that was created at block 425, such as in the fashions described herein.

FIG. 4C is a flowchart illustrating a method 440 that may be performed in conjunction with method 300, such as when an authentication user is granted access to the computing device at block 350. Furthermore, the method 400 may be performed in conjunction with the method 400 or the method 420, such as described above. As shown in FIG. 4C, the method 440 includes, at block 445, receiving, by the computing device 210, an indication from the authenticated user to log out of the user account 216 (of block 410 or 425). At block 450, the method 440 includes, in response to the indication at block 445, discontinuing the user's access to the computing device 210. At block 455, the method 440 includes again receiving, from the user by the computing device 210, the set of user credentials. At block 460, the method 440 includes granting the user access to the computing device 210 using the received account secret 217 (from the user account profile 216 on the computing device 210) to authenticate the again received set of user credentials. Such approaches allow users that have been previously successfully authenticated on the computing device 210 to gain access to the computing device 210 when the computing device 210 is offline (e.g., does not have access to the network 220 and/or the authentication server 230).

Figure 5:
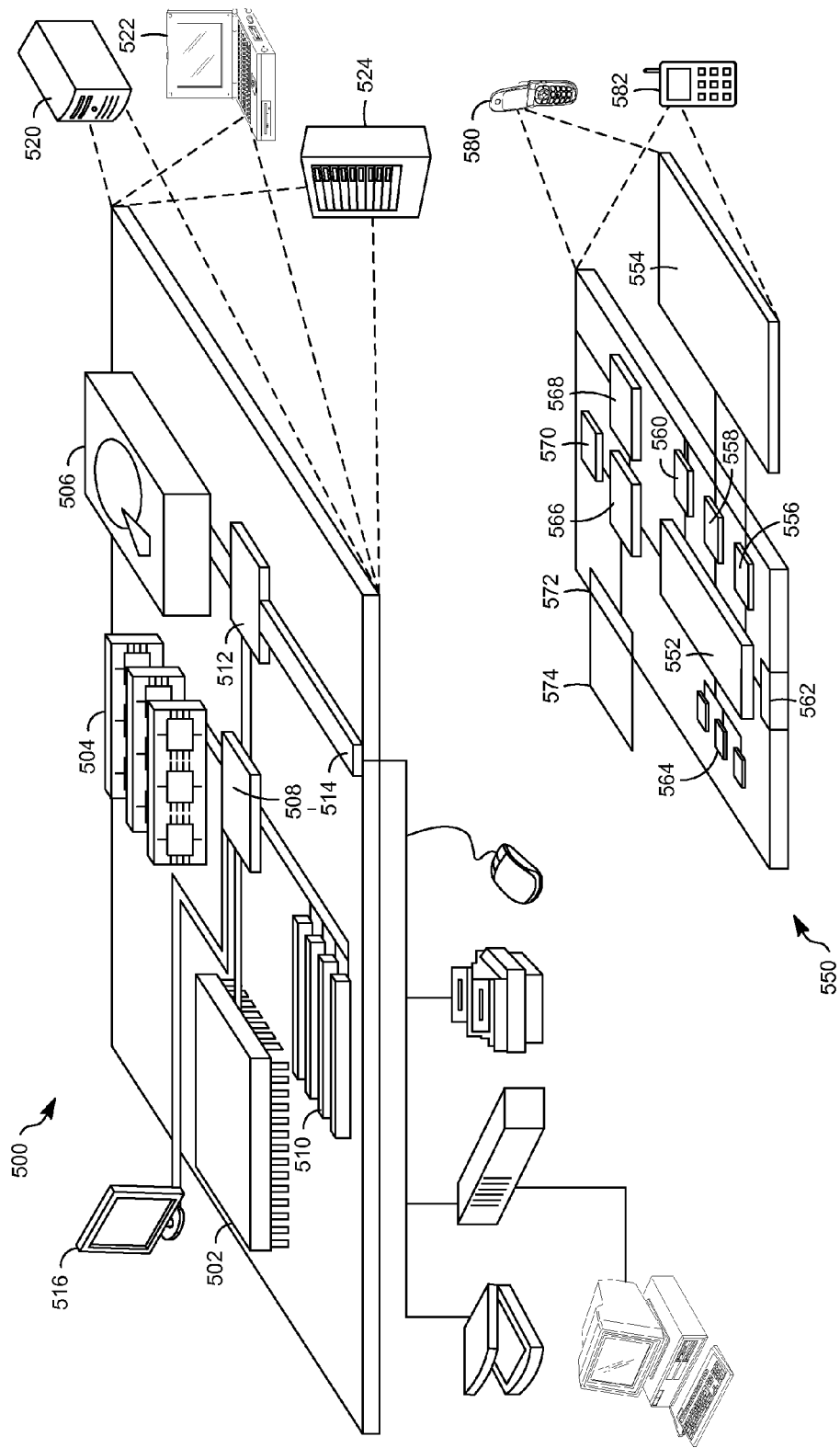
FIG. 5 shows an example of a computer device and a mobile computer device that can be used to implement the techniques described here.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a non-transitory computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method for authenticating a user on a computing device, the method comprising:
    providing, on a display device of the computing device and prior to starting a session of an operating system on the computing device, a graphical user interface (GUI), the GUI comprising a user authentication display portion;
    receiving, from a remote user authentication server, swappable user authenticating service logic that is not integrated into the operating system of the computing device, the user authenticating service logic including visual content displayed in the user authentication display portion and functional operation of the user authentication display portion, the visual content and the functional operation being determined by the remote user authentication server;
    receiving, from a user via the user authentication display portion, a set of user credentials;
    communicating, by the computing device, the received set of user credentials to the remote user authentication server;
    receiving, from the remote user authentication server, an authorization message indicating whether or not authentication of the set of user credentials was successful;
    in the event authentication of the set of user credentials was successful, granting the user access to the computing device, the granting starting the session of the operating system on the computing device; and
    in the event authentication of the set of user credentials was not successful, denying the user access to the computing device.

2. The method of claim 1, wherein the user credentials comprise at least one of:
    a username;
    a password;
    a personal identification number;
    a voice authentication sample;
    a photograph; and
    a fingerprint scan.

3. The method of claim 1, wherein, in the event the set of user credentials was previously authenticated using the computing device, granting the user access to the computing device comprises:
    synchronizing one or more authorization tokens associated with the set of user credentials between the computing device and the remote user authentication server; and
    storing, on the computing device, the synchronized authentication tokens in a user account profile that is associated with the set of user credentials.

4. The method of claim 3, wherein:
    the operating system of the computing device comprises a browser based operating system; and
    synchronizing the one or more authorization tokens comprises synchronizing one or more browser cookies in the user account profile.

5. The method of claim 1, wherein, in the event the set of user credentials was not previously authenticated using the computing device, granting the user access to the system comprises:
    creating, on the computing device, a user account profile that is associated with the set of user credentials;
    receiving, from the remote user authentication server:
        a cryptographically generated value that is based on the set of user credentials; and
        executable code configured, when executed by the computing device, to produce the cryptographically generated value from the set of user credentials; and
    storing the received cryptographically generated value and the received executable code in the created user account profile.

6. The method of claim 1, wherein, in the event the set of user credentials was not previously authenticated using the computing device, granting the user access to the system comprises:
    creating, on the computing device, a user account profile that is associated with the set of user credentials;
    receiving, from the remote user authentication server, one or more authorization tokens associated with the set of user credentials; and
    storing, by the computing device, the received one or more authorization tokens in the created user account profile.

7. The method of claim 6, wherein:
    the operating system of the computing device comprises a browser based operating system;
    receiving the one or more authorization tokens comprises receiving one or more browser cookies; and
    storing the received one or more authorization tokens comprises populating a browser cookie jar of the created user account profile.

8. The method of claim 6, wherein receiving the one or more authorization tokens comprises receiving an account secret associated with the set of user credentials.

9. The method of claim 8, further comprising:
    receiving, by the computing device, an indication from the user to log out of the user account;
    in response to the indication, discontinuing the user's access to the computing device;
    again receiving, from the user by the computing device, the set of user credentials; and
    granting the user access to the computing device using the received account secret to authenticate the again received set of user credentials.

10. The method of claim 8, wherein the account secret comprises:
    a cryptographically generated value that is based on the set of user credentials; and executable code configured, when executed by the computing device, to produce the cryptographically generated value from the set of user credentials.

11. The method of claim 1, wherein providing the GUI further comprises providing an operating system display portion, wherein content of the operating system display portion is determined by the operating system of the computing device.

12. The method of claim 1, wherein the user authentication display portion comprises one of an inline frame and a mini-web-browser.

13. The method of claim 1, wherein:
the operating system of the computing device comprises a browser-based operating system; and
the visual content displayed in the user authentication display portion and the functional operation of the user authentication display portion are provided in accordance with a browser extension.

14. The method of claim 13, wherein an identity of the remote user authentication server is determined by the browser extension.

15. A computing device comprising:
a processor;
a display device;
a non-transitory machine readable medium having instructions stored thereon, wherein the instructions, when executed by the processor, cause the computing device to:
provide, on the display device and prior to starting a session of an operating system on the computing device, a graphical user interface (GUI), the GUI comprising a user authentication display portion;
receive, from a remote authentication server, swappable user authenticating service logic that is not integrated into the operating system of the computing device, the user authenticating service logic including visual content displayed in the user authentication display portion and functional operation of the user authentication display portion, the visual content and functional operation being determined by the remote authentication server;
receive, from a user via the user authentication display portion, a set of user credentials;
communicate the received user credentials to the remote authentication server;
receive, from the remote authentication server, an authorization message indicating whether or not authentication of the set of user credentials was successful;
in the event authentication of the set of user credentials was successful, grant the user access to the computing device, the granting starting the session of the operating system on the computing device; and
in the event authentication of the set of user credentials was not successful, deny the user access to the computing device.

16. The computing device of claim 15, wherein, in the event the set of user credentials was previously authenticated using the computing device, the instructions for granting the user access to the computing device include instructions that, when executed by the processor, cause the computing device to:
synchronize one or more authorization tokens associated with the set of user credentials between the computing device and the remote authentication server; and
store, on the computing device, the synchronized authentication tokens in a user account profile that is associated with the set of user credentials.

17. The computing device of claim 16, wherein:
an operating system of the computing device comprises a browser based operating system; and
synchronizing the one or more authorization tokens comprises synchronizing one or more browser cookies in the user account profile.

18. The computing device of claim 15, wherein, in the event the set of user credentials was not previously authenticated using the computing device, the instructions for granting the user access to the computing device include instructions that, when executed by the processor, cause the computing device to:
create, on the computing device, a user account profile that is associated with the set of user credentials;
receive, from the remote authentication server, an account secret associated with the set of user credentials, the account secret including:
a cryptographically generated value that is based on the set of user credentials; and
executable code configured, when executed by the computing device, to produce the cryptographically generated value from the set of user credentials; and
store the received cryptographically generated value and the received executable code in the created user account profile.

19. The computing device of claim 18, wherein the instructions, when executed by the processor, further cause the computing device to:
receive an indication from the user to log out of a user account associated with the user account profile;
in response to the indication, discontinue the user's access to the computing device;
again receive, from the user, the set of user credentials; and
grant the user access to the computing device using the received account secret to authenticate the set of user credentials.

20. A non-transitory machine readable medium having instructions stored thereon, wherein the instructions, when executed by a processor, cause a computing device to:
provide, on a display device of the computing device and prior to starting a session of an operating system on the computing device, a graphical user interface (GUI), the GUI comprising a user authentication display portion;
receive, from a remote user authentication server, swappable user authenticating service logic that is not integrated into the operating system of the computing device, the user authenticating service logic including visual content displayed in the user authentication display portion and functional operation of the user authentication display portion, the visual content and the functional operation being determined by the remote user authentication server;
receive, from a user via the user authentication display portion, a set of user credentials;
communicate the received set of user credentials to the remote user authentication server;
receive, from the remote user authentication server, an authorization message indicating whether or not authentication of the set of user credentials was successful;
in the event authentication of the set of user credentials was successful, grant the user access to the computing device, the granting starting the session of the operating system on the computing device; and
in the event authentication of the set of user credentials was not successful, deny the user access to the computing device.

21. A method for authenticating a user on a computing device, the method comprising:
- providing, on a display device of the computing device and prior to starting a session of an operating system on the computing device, a graphical user interface (GUI), the GUI comprising a user authentication display portion;
- receiving, from a remote authentication server, swappable user authenticating service logic that is not integrated into the operating system of the computing device, the user authenticating service logic including visual content displayed in the user authentication display portion and functional operation of the user authentication display portion, the visual content and functional operation being determined by the remote authentication server;
- receiving, from a user via the user authentication display portion, a set of user credentials;
- communicating, by the computing device, the received set of user credentials to the remote authentication server;
- receiving, from the remote authentication server, an authorization message indicating that authentication of the set of user credentials was successful; and
- granting the user access to the computing device, the granting starting the session of the operating system on the computing device.

* * * * *